(12) United States Patent
Liang et al.

(10) Patent No.: US 8,687,869 B2
(45) Date of Patent: Apr. 1, 2014

(54) SYSTEM AND METHOD FOR ACCELERATION OF IMAGE RECONSTRUCTION

(75) Inventors: Jerome Z. Liang, Stony Brook, NY (US); Zigang Wang, Knoxville, TN (US)

(73) Assignee: The Research Foundation of State of University of New York, New York, NY (US)

(*) Notice: Subject to any disclaimer, the term of this patent is extended or adjusted under 35 U.S.C. 154(b) by 1000 days.

(21) Appl. No.: 12/095,662

(22) PCT Filed: Nov. 30, 2006

(86) PCT No.: PCT/US2006/061368
§ 371 (c)(1), (2), (4) Date: Jun. 8, 2010

(87) PCT Pub. No.: WO2007/120300
PCT Pub. Date: Oct. 25, 2007

(65) Prior Publication Data
US 2010/0266178 A1    Oct. 21, 2010

Related U.S. Application Data

(60) Provisional application No. 60/741,495, filed on Nov. 30, 2005.

(51) Int. Cl.
*G06K 9/00* (2006.01)
(52) U.S. Cl.
USPC ........... 382/131; 382/128; 382/254; 382/260; 250/363.02; 250/369; 250/363.03; 250/363.04; 378/98.4; 702/111; 367/7

(58) Field of Classification Search
USPC ............ 382/128, 254, 260, 131; 250/363.02, 250/363.03, 363.04, 369; 378/98.4; 702/111; 367/7
See application file for complete search history.

(56) References Cited

U.S. PATENT DOCUMENTS

| | | | | | |
|---|---|---|---|---|---|
| 5,331,553 | A | * | 7/1994 | Muehllehner et al. | 250/363.02 |
| 5,339,282 | A | * | 8/1994 | Kuhn et al. | 367/7 |
| 5,561,611 | A | * | 10/1996 | Avinash | 702/111 |
| 5,564,412 | A | * | 10/1996 | Hennig | 600/410 |
| 5,576,548 | A | * | 11/1996 | Clarke et al. | 250/369 |

(Continued)

OTHER PUBLICATIONS

Google patents search result.*

(Continued)

*Primary Examiner* — Dilek B Cobanoglu
(74) *Attorney, Agent, or Firm* — Andrews Kurth LLP (57) ABSTRACT

A method for reconstructing an image from emission data includes generating a compressed point-spread function matrix, generating an accumulated attenuation factor; and performing at least one image projection operation on an image matrix of the emission data using the compressed point-spread function matrix and the accumulated attenuation factor. The image projection operation can include rotating an image matrix and an exponential attenuation map to align with a selected viewing angle. An accumulated attenuation image is then generated from the rotated image matrix and rotated exponential attenuation map and a projection image is generated for each voxel by multiplying the accumulated attenuation image and point spread function matrix for each voxel. The rotating and multiplying operations can be performed on a graphics processing unit, which may be found in a commercially available video processing card, which are specifically designed to efficiently perform such operations.

16 Claims, 8 Drawing Sheets

(56) References Cited

U.S. PATENT DOCUMENTS

| | | | | |
|---|---|---|---|---|
| 5,602,895 | A * | 2/1997 | Fivez et al. | 378/98.4 |
| 5,641,965 | A * | 6/1997 | Barber et al. | 250/363.04 |
| 5,949,914 | A * | 9/1999 | Yuen | 382/254 |
| 6,528,793 | B1 * | 3/2003 | Chen et al. | 250/363.03 |
| 7,492,967 | B2 * | 2/2009 | Toki et al. | 382/299 |
| 7,609,870 | B2 * | 10/2009 | Li | 382/131 |
| 7,693,343 | B2 * | 4/2010 | Klompenhouwer et al. | 382/260 |
| 7,742,239 | B2 * | 6/2010 | Bell et al. | 359/737 |
| 2002/0063868 | A1 * | 5/2002 | Florin et al. | 356/625 |
| 2009/0324029 | A1 * | 12/2009 | Araikum | 382/128 |

OTHER PUBLICATIONS

Google patents search, Dec. 28, 2012.*
Google patenst search, Nov. 1, 2013.*
Google search, Nov. 1, 2013.*
Wang et al., "Speedup OS-EM Image Reconstruction by PC Graphics Card Technologies for Quantitative SPECT with Varying Focal-Length Fan-Beam Collimation" IEEE Transactions on Nuclear Science, vol. 52, No. 5, Oct. 2005**.
International Search Report and Written Opinion for International Application No. PCT/US2006/061368.

* cited by examiner

SYSTEM AND METHOD FOR ACCELERATION OF IMAGE RECONSTRUCTION

STATEMENT OF PRIORITY AND RELATED APPLICATIONS

This application claims priority to U.S. Provisional Application 60/741,495 filed on Nov. 30, 2005, entitled Hardware Based Acceleration of OS-EM Image Reconstruction for Quantitative SPECT, the disclosure of which is hereby incorporated by reference in its entirety.

STATEMENT OF GOVERNMENT RIGHTS

This invention was made with government support under grant number HL51466 by the National Institutes of Health of the National Heart, Lung and Blood Institute. The United States government has certain rights to the invention.

BACKGROUND OF THE INVENTION

The advent of medical imaging of the anatomy's structure and function has allowed radiologists to view a patient's anatomy without the immediate need for invasive surgery. Transmission Tomography (TT), such as Computed Tomography (CT), allows the radiologist to view the patient's anatomical structure, while Emission Tomography (ET) allows the radiologist to view the patient's anatomical function. Positron Emission Tomography (PET) and Single Photon Emission Computed Tomography (SPECT) are common techniques for imaging anatomical function.

Typically, a SPECT system acquires the image data from photons radiated from a subject that has been injected with a radioactive tracer that radiates photons. A rotating gamma camera commonly acts as the recipient of the photons. Before the photons reach the rotating gamma camera, however, the photon pass through a collimator, which rotates with the camera and ensures that the camera only records photons that pass perpendicular to the camera lens. Various collimators exist in photons that pass perpendicular to the camera lens. Various collimators exist in practice, such as varying focal-length fan-beam (VFF) collimators, parallel-hole (PH) collimators, fan-beam (FB) collimators, fixed focal-length fan-beam collimators, parallel-beam collimators, and varying focal-length cone-beam collimators. Each collimator geometry has a unique performance capability with distinct advantages and disadvantages, making some collimators more favorable than others when imaging a particular anatomical function. For instance, as compared to the FB geometry, the VFF geometry, with an equivalent spatial resolution, improves signal-to-noise ratio and acquires more counts from regions where the FB collimations encounters truncation. Depending on the selected collimator, the image produced by the camera may vary.

Once the photon passes through the collimator and the camera receives and records the photon, a processor reconstructs the received data to create a reconstructed three dimensional (3D) image of the subject. Typically, a processor algorithm is used to transform the camera's emission data to generate a 3D image. A common algorithm used in SPECT image reconstruction is the iterative maximum likelihood expectation maximization (ML-EM) reconstruction algorithm with the ordered-subsets (OS) strategy, the combination of which is commonly referred to as the OS-EM algorithm. There are three parts to the OS-EM algorithm: (1) iterative re-projection of the volume at each angle for the projection image, (2) iterative back-projection of the projection data, and (3) grouping of the detector bins in the camera. Although the OS-EM algorithm achieves a good quantitative reconstruction, there are limitations in clinical use. One drawback is the high computational cost of the algorithm resulting from the large vectors and matrices associated with producing a high-resolution image reconstruction. Research efforts have been devoted to mitigate this drawback by (1) developing efficient simulators for the re-projection and back-projection cycle, such as by the use of the geometry warping with distance-dependent convolution or the recursive ray-tracing with geometry symmetries; and (2) investigating sophisticated strategies to speedup the convergence to a satisfactory result, such as the OS technique. Although a significant speed gain was observed by the addition of the OS technique, the reconstruction time is still typically too long for acceptable clinical use. Improved techniques for image reconstruction for SPECT images are desired.

SUMMARY OF THE INVENTION

A first method for reconstructing an image from emission data collected from a subject, such as SPECT image data, includes generating a compressed point-spread function matrix, generating an accumulated attenuation factor, and performing at least one image projection operation on an image matrix of the emission data using the compressed point-spread function matrix and the accumulated attenuation factor.

Preferably, the compressed point-spread function matrix is generated in a pre-processing operation prior to performing the at least one image projection operation. The projection operation can include re-projection operations, back projection operations, or both.

In a preferred method, the image projection operation includes rotating an image matrix and an exponential attenuation map, generated from the accumulated attenuation factor, to align with a selected viewing angle. An accumulated attenuation image is then generated from the rotated image matrix and rotated exponential attenuation map and a projection image is generated for each voxel by multiplying the accumulated attenuation image and point spread function matrix for each voxel. Preferably, the steps of rotating the image matrix and exponential attenuation map, as well as multiplying the accumulated attenuation image and point spread function matrix are performed on a graphics processing unit, which may be found in a commercially available video processing card.

In further embodiments, the image projection operations can be performed by an ordered subset-expectation maximization algorithm or by an maximum likelihood-expectation maximization algorithm.

DETAILED DESCRIPTION OF PREFERRED EMBODIMENTS

An overview of the present method is illustrated by reference to the simplified flow chart in FIG. 1. An exemplary embodiment of the present invention assumes that there is projection image data $\{p_{lmn}\}$ acquired by the gamma camera fitted with a collimator known in the art 100, where l is a particular view angle and (m,n) refers to the detector bin in the camera (hereafter, (l,m,n) will refer to the detector bin). The image used for the projection image data has a plurality of volume elements, referred to as voxels, where each voxel has the form (i,j,k). The plurality of voxels creates an emission source distribution $\{f_{ijk}\}$. Upon acquisition of the image data, the image may be reconstructed using, for example, but not limited to, an OS-EM algorithm, which is well-known in the art. The algorithm contains a re-projection operation, also known as a forward projection operation, and a back-projection operation.

Each projection operation in the conventional OS-EM algorithm involves the calculation of a point-spread function (PSF) matrix and an accumulated attenuation factor (AAF). The present invention preferably involves the compression of the PSF matrix 105 and the calculation of the AAF 110 with a personal computer (PC) graphics card or graphics processing unit (GPU) to form an exponential attenuation map (EAM). Once the PSF matrix is compressed and the EAM is mapped, they may be integrated and loaded into the video memory of the PC graphics card or GPU for image reconstruction 115. Inside the GPU, an iterative OS-EM proceeds through iterations of re-projecting and back-projecting 120 using the reduced data sets from steps 105 and 110. The re-projection and back-projection processes are further illustrated by FIG. 5, FIG. 6, and FIG. 11, which are discussed in further detail below.

The basic elements of the OS-EM algorithm are the re-projection and back-projection operations with an order-subset technique. Using the ML-EM algorithm, the emission source distribution $\{f_{ijk}\}$ can be reconstructed iteratively from $\{p_{lmn}\}$ as follows:

$$\text{Re-projection: } \bar{p}_{lmn}^{(I)} = \sum_{ijk} f_{ijk}^{(I)} h_{ijk,lmn} + s_{lmn} \quad (1)$$

$$\text{Back-projection: } f_{ijk}^{(I+1)} = \frac{f_{ijk}^{(I)}}{\sum_{lmn} h_{ijk,lmn}} \sum_{lmn} h_{ijk,lmn} \frac{p_{lmn}}{\bar{p}_{lmn}^{(I)}}$$

where the projection coefficient $h_{ijk,lmn}$ is the fraction of photons that emit from voxel (i,j,k) and I is the iteration number. The scatter contribution $\{s_{lmn}\}$ in the measured count $\{p_{lmn}\}$ is included as a known parameter, which can be estimated by a multiple energy-window acquisition protocol, as known in the art. By the OS strategy, the detector bins are grouped into G groups or subsets $\{S_\alpha: \alpha=1, 2, \ldots, n_G\}$. The resulting OS-EM reconstruction algorithm consists of a series of iterations, each of which includes $n_G$ pairs of re-projection and back-projection operations:

$$\text{For subset } \alpha = 1, 2, \ldots, n_G \quad (2)$$

$$\text{Reprojection: } \bar{p}_{lmn}^{(I,\alpha)} = \sum_{i'j'k'} f_{i'j'k'}^{(I,\alpha)} h_{i'j'k',lmn} + s_{lmn},$$

$$\text{for } (l, m, n) \in S_\alpha$$

$$\text{Backprojection: } f_{ijk}^{(I,\alpha+1)} = \frac{f_{ijk}^{(I,\alpha)}}{\sum_{lmn \in S_\alpha} h_{ijk,lmn}} \sum_{lmn \in S_\alpha} h_{ijk,lmn} \frac{p_{lmn}}{\bar{p}_{lmn}^{(I,\alpha)}}$$

where after $\alpha$ runs from 1 to $n_G$, a full iteration is completed for index I, i.e., $f_{ijk}^{(I,n_G+1)}$ is assigned to $f_{ijk}^{(I+1)}$. Then $\alpha$ starts again from 1 to $n_G$ for the next iteration. In the following description, the exemplary embodiment of the present invention uses the OS-EM algorithm. The ML-EM algorithm may be considered as a specific case of the OS-EM algorithm, where all detector bins are grouped into one group. In equation (2), each projection matrix element $h_{ijk,lmn}$ is the product of the PSF matrix psf(i,j,k,l,m,n) and the accumulated attenuation factor, which may be represented by:

$$h_{ijk,lmn} = psf(i, j, k, l, m, n) \cdot e^{-\sum_q \mu(u_q, v_q, w_q) d_q} \quad (3)$$

where $\{(u_q, v_q, w_q, d_q)\}$ is the list of voxel indices and intersecting lengths on the path from voxel (i,j,k) to detector bin (l,m,n).

Figure 1:
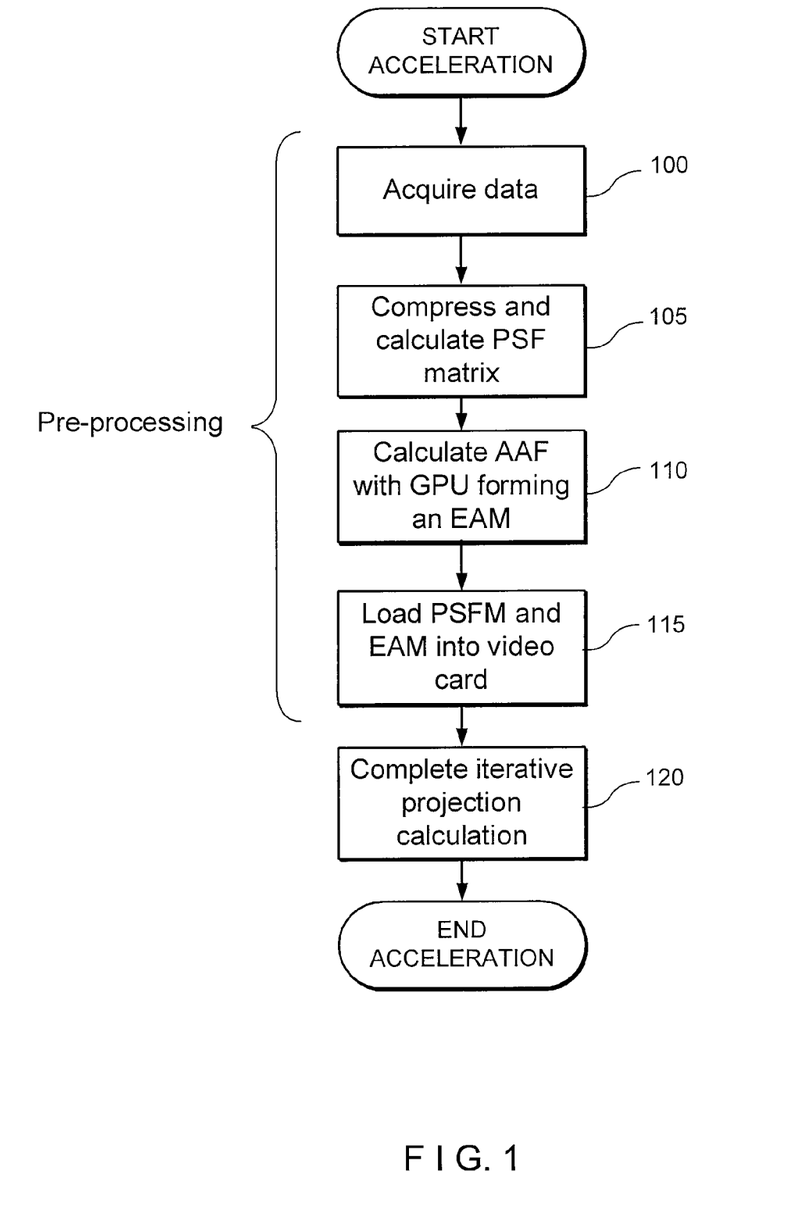
FIG. 1 is a simplified flow chart illustrating the various steps in one exemplary embodiment of the present method for accelerating image reconstruction.
Figure 2A:
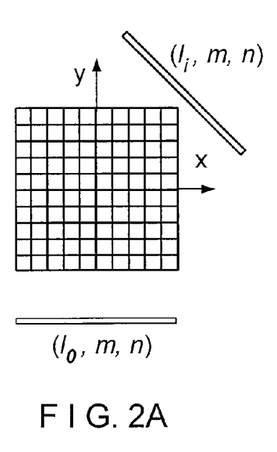
FIG. 2A is an exemplary lattice showing the original dataset lattice in PSF compression.
Figure 2B:
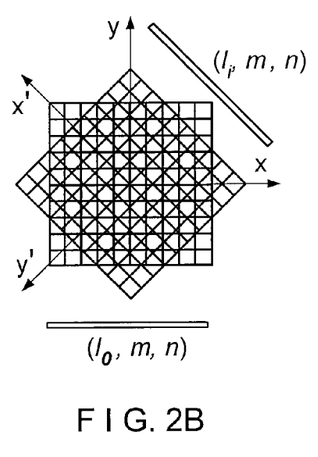
FIG. 2B is an exemplary lattice showing the rotating and re-sampling process in PSF compression.
Figure 2C:
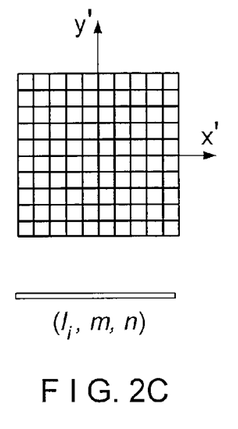
FIG. 2C is an exemplary lattice showing the resulting rotated dataset lattice in PSF compression.

Referring to FIG. 1, to accelerate image reconstruction, in step 105, the present method compresses the PSF matrix from a six dimensional matrix to a four dimensional matrix. The present PSF matrix compression exploits the various elements of symmetry in the PSF matrix to accelerate the overall reconstruction. One such element of symmetry is angular geometrical symmetry that the PSF matrix exhibits in 3D space. In the PSF matrix, the value of each element is only determined by the relative position of a particular voxel of the reconstructed image with respect to the detector bin. Thus, only one view's PSF matrix elements need to be stored. For other views, the re-projection and back-projection operations can be performed using the same matrix on the rotated attenuation map and the iteratively-reconstructed image dataset, as illustrated in FIG. 2A, FIG. 2B, and FIG. 2C. Because commercially available GPU's support image rotation, these operations can be performed quickly and efficiently. FIG. 2A shows the original dataset lattice, FIG. 2B shows the rotating and re-sampling process for a different view, and FIG. 2C shows the resulting rotated dataset lattice. The similarity of FIG. 2C and FIG. 2A demonstrates angular symmetry. The angular similarity allows the original 6D PSF matrix to be compressed into a 5D matrix: $psf_a(i,j,k,m,n)$.

Figure 3A:
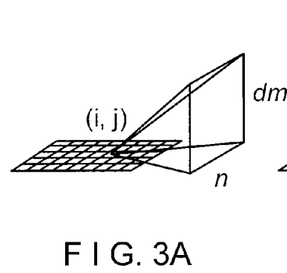
FIG. 3A is an exemplary illustration of the original PSF mapping image for a particular voxel.
Figure 3B:
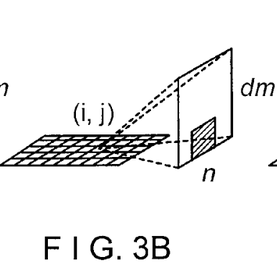
FIG. 3B is an exemplary illustration of the non-zero part of the PSF mapping image in FIG. 3A as indicated by the shadowed region.
Figure 3C:
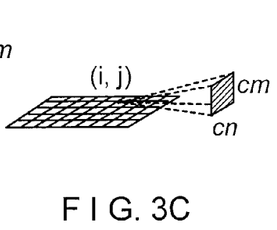
FIG. 3C is an exemplary illustration of the retained non-zero region of the PSF mapping image for a particular voxel in an image slice.

In addition to angular geometrical symmetry, the conventional PSF matrix also exhibits slice symmetry, which can be utilized for further reduction of the PSF matrix size. Given two voxels with the same $(i_0, j_0)$ but at two different slices $k_0$ and $k_l$, the similar spatial relationship of the two voxels allows the value of the PSF matrix for the first voxel $psf_a(i_0,j_0,k_0,k_0+\delta m, n)$ to be equal to the value of the PSF matrix of the second voxel $psf_a(i_0, j_0,k_l,k_l+\delta m,n)$. Applying this relationship, the PSF matrix can be further compressed to a 4D PSF matrix $psf_b(i,j, \delta m,n)$, where $\delta m$ is the relative slice distance between voxel (i,k) and detector bin (m,n). Thus for each voxel (i,j) on a slice, its PSF effect on the detector plane can be represented as $psf^{(i,j)}(\delta m,n)$, which is defined as the PSF mapping image of voxel (i,j) at that slice, as illustrated in FIG. 3A. As illustrated in FIG. 3B, the values of most pixels $(\delta m,n)$ of the PSF mapping image are zero due to the geometrical structure of the collimated detection. As a result, the entire PSF matrix may be transformed to a new form:

$$\{psf^{new}(i,j,cm,cn) | i\in[1,width], j\in[1, height], cn\in[1, width_{slice}^{non-zero}], cm\in[1,height_{bin}^{non-zero}]\} \quad (4)$$

where i and j indicate the pixel position on one CT image slice; cm and cn indicate the pixel position in the non-zero PSF mapping image at view 0; and $width_{slice}^{non-zero}$ and $height_{bin}^{non-zero}$ are the width and height of the non-zero part of the original PSF mapping image. The width and height values are usually far less than the slice number and the bin number, respectively.

Compared to the original PSF matrix, the compressed PSF matrix of the present method is considerably smaller. An exemplary embodiment of the matrix illustrates that the whole compressed PSF matrix can be less than 128 Megabytes for reconstruction of a 3D image whose dataset size is up to a 512×512×512 pixel matrix. Since the whole compressed PSF matrix remains the same throughout the entire OS-EM iteration procedure, it can be calculated at a pre-processing stage and loaded into the computer memory prior to the iterative process, further enhancing the run-time performance of image reconstruction.

In addition to the compressed PSF matrix, an exemplary embodiment of the reconstruction acceleration employs a GPU for the calculation of the AAF in step 110. To accelerate the calculation of the accumulated attenuation factors, it is preferable that the high speed processes in graphics cards or GPU be used for these operations.

Figure 4A:
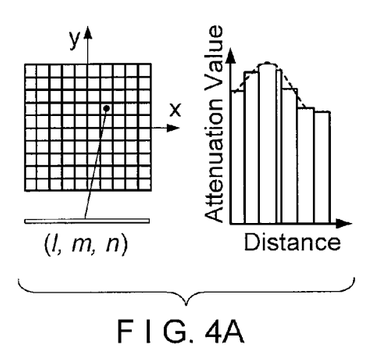
FIG. 4A is an exemplary illustration of an accumulated attenuation factor from a non-evenly sampled path.
Figure 4B:
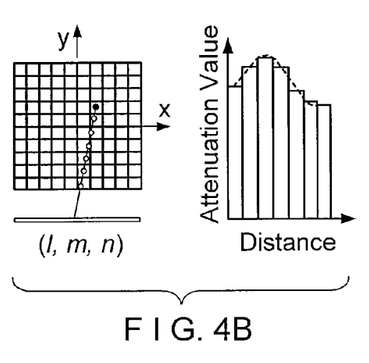
FIG. 4B is an exemplary illustration of an accumulated attenuation factor from an evenly sampled path.

For a voxel (i,j,k), the AAF with respect to detector bin (l,m,n) is a summation of multiplications of attenuation coefficients and intersecting lengths on the path from the voxel to the bin, as shown in FIG. 4A. The intersecting lengths are not uniform for each ray, thereby creating a challenge for any acceleration attempt by increasing the entire reconstruction calculation time. To mitigate this difficulty, an even-sampling strategy is employed. The path from voxel (i,j,k) to detector bin (l,m,n) is sampled evenly with a fixed length unit, which can be one voxel unit. The attenuation values of the sampled points are determined by interpolation from the original attenuation values. Each interpolated individual attenuation factor may be different from its original value, but the accumulated factor along the path matches the original AAF, see FIG. 4A and FIG. 4B. Thus the AAF can be calculated by:

$$A_{ijk,lmn} = e^{-\sum_q \mu(u_q,v_q,w_q) d_q} \approx e^{-\sum_p \mu(u_p,v_p,w_p)\cdot \delta d} \quad (5)$$

$$= \prod_p e^{-\mu(u_p,v_p,w_p)\cdot \delta d}$$

$$= e^{-\mu(u_{p0},v_{p0},w_{p0})\cdot \delta d} \cdot$$

$$e^{-\mu(u_{p1},v_{p1},w_{p1})\cdot \delta d} \ldots e^{-\mu(u_{pn},v_{pn},w_{pn})\cdot \delta d}$$

where p represents the evenly-sampled points on the path from the voxel (i,j,k) (represented by $p^0$) to the detector bin (l,m,n) (represented by $p^n$), and $\delta d$ is the length unit, reflecting the distance between two adjacent re-sampled points. Since $\delta d$ is fixed during all iterations, the GPU can perform all the exponential calculations in equation (5) instead of performing the summation and then the exponential function. This calculation may be performed before the iterations of OS-EM algorithm begin, thereby reducing the processing time for the reconstruction. For each voxel in the attenuation factor of Equation (5), its value $\mu$ is replaced by $e^{-\mu \cdot \delta d}$. The combination of these exponentials for each voxel forms the exponential attenuation map (EAM) $\{e^{-\mu \cdot \delta d}\}$ in step 110.

Figure 5:
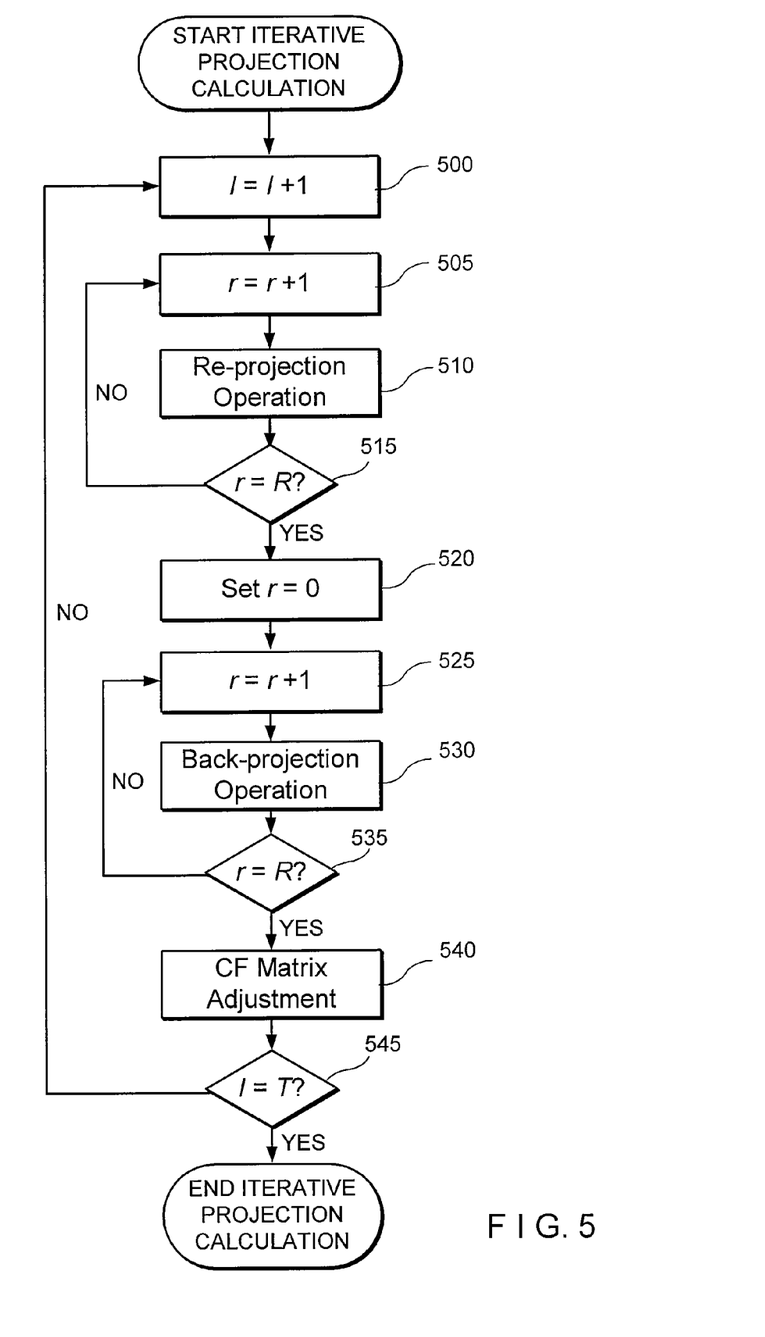
FIG. 5 is a simplified flow chart illustrating the steps of the iterative projection calculation for reconstruction.

Upon calculation of both the compressed PSF matrix and the EAM, the computed datasets represented by the PSF matrix and the EAM may be loaded into the video memory of a processor, step 115, for projection calculations in step 120. Referring to FIG. 5, the iterative projection calculations, step 120 in FIG. 1, continue for a total number of T iterations, where I is an iteration and T is the total number of desired iterations, as shown in steps 500 through 545. The re-projection operation of the OS-EM algorithm of step 510 continues for a total of R iterations, where r is a particular view and R is the total number of views, as shown in steps 505 through 515.

Figure 6:
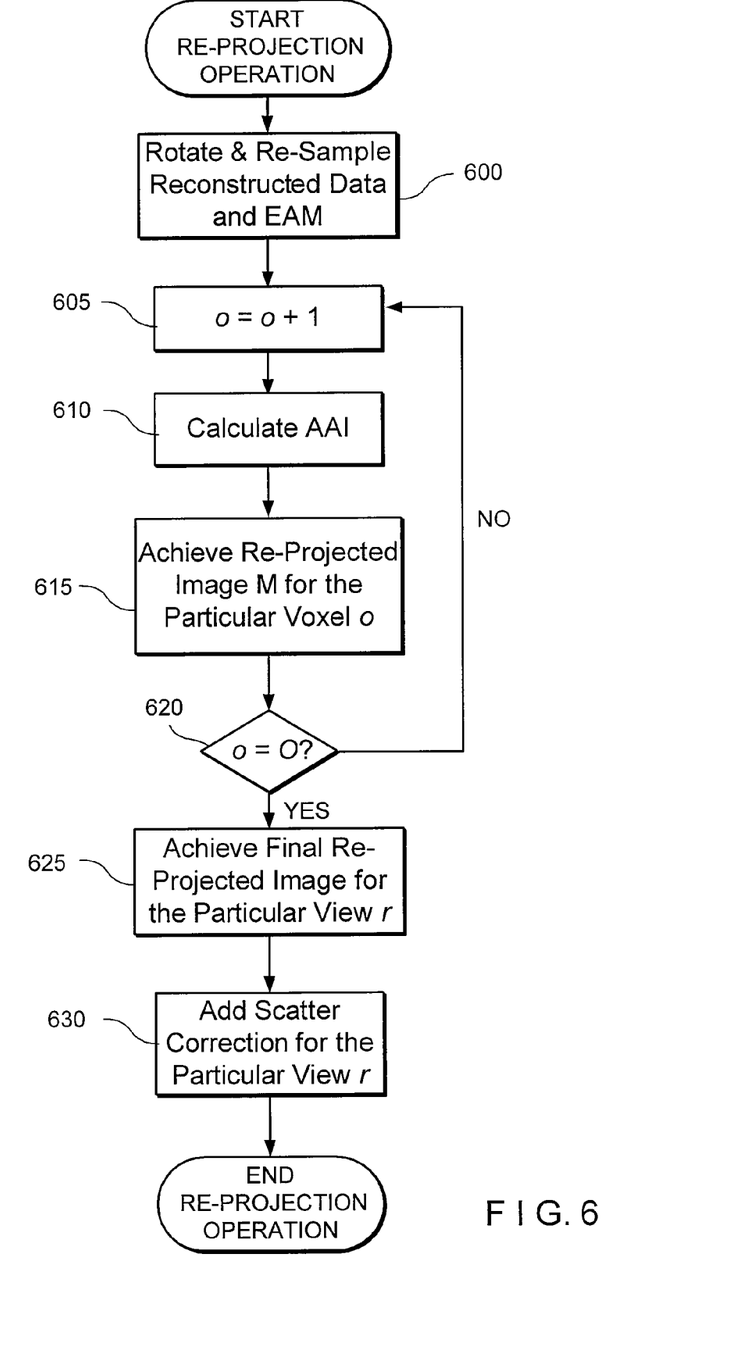
FIG. 6 is a simplified flow chart illustrating the steps of the re-projection operation segment of the iterative projection calculation.

Referring to FIG. 6, the steps of re-projection in step 510 contain several sub-steps, shown by steps 600 through 630. Using the compressed PSF matrix and AAF described above, the re-projection procedure in the OS-EM algorithm can be summarized as:

$$\overline{p}_{lmn}^{(l,\alpha)} = \sum_{ijk} f_{ijk}^{(l,\alpha)} h_{ijk,lmn} + s_{lmn} \quad (6)$$

$$= \sum_l \left[ \sum_{ijk} f_{ijk}^{(l,\alpha)} h_{ijk}^l(m,n) + s_{mn}^l \right]$$

$$= \sum_l \left\{ \sum_{ijk} f_{ijk}^{(l,\alpha)} [psf_{ijk}(m,n) \cdot A_{ijk}^l(m,n)] + s_{mn}^l \right\}$$

Figure 7:
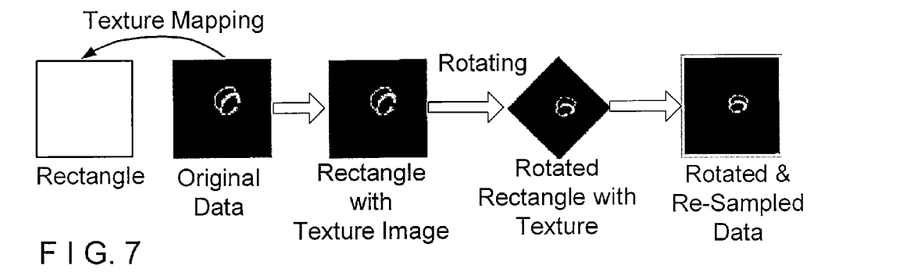
FIG. 7 is an exemplary illustration of the use of texture mapping for rotating and re-sampling an image.

Given a view angle l, the estimated source f(i,j,k) and the EAM may be rotated to be parallel to the surface of the collimator and re-sampled in step 600 as shown in FIG. 7. Then, for each voxel o in the rotated reconstructed data, an accumulated attenuation image (AAI) may be calculated in step 610. In step 615, a re-projected image M of a particular voxel may then be derived by multiplying the AAI, acquired in step 610, with the corresponding PSF matrix for the particular voxel. This set of calculations continues for a total of O iterations, shown in steps 605, 620, where O is the total number of voxels in the rotated data and o is the particular voxel being referenced in the calculations.

Figure 8:
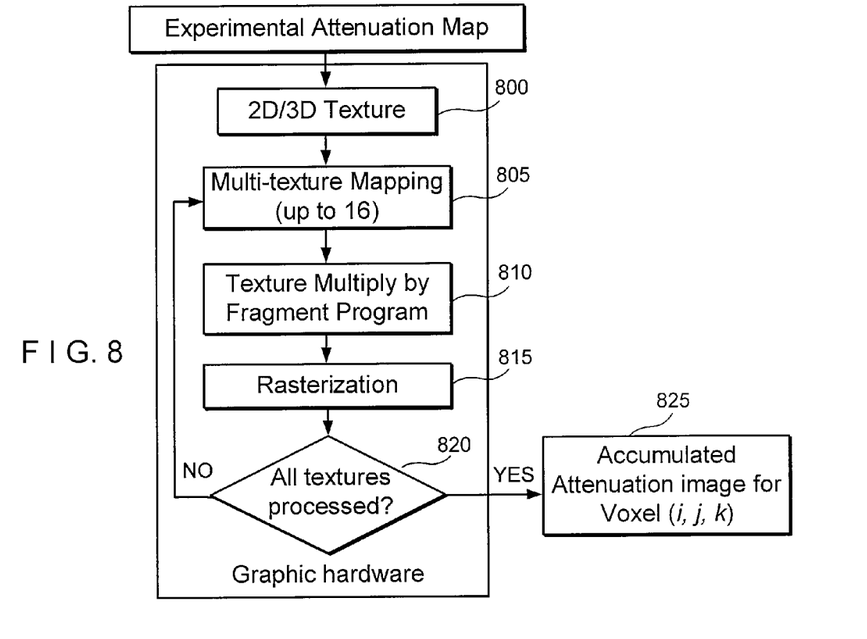
FIG. 8 is a simplified flow chart illustrating the hardware-accelerated generation method on the PC graphics card or GPU.
Figure 9:
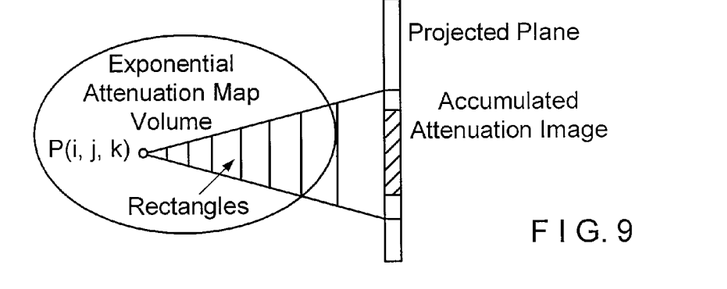
FIG. 9 is an exemplary illustration of the generation of an accumulated attenuation image from a particular voxel (i,j,k)

Referring to step 610, the AAI may be calculated in the steps shown in FIG. 8. Using the EAM, the calculation of the AAF for each voxel o is implemented with the PC graphics hardware as follows. As shown in FIG. 9, for each voxel o, a series of projection rectangles are determined on which the corresponding exponential attenuation maps are mapped as 2D textures. In step 800, each voxel o in the EAM volume is converted to a plurality of textures. Modern GPUs, such as Nvidia GeforceFX series, support up to 16 textures on one rectangle. Therefore, each voxel o may be converted into up to 16 textures. These textures may be mapped onto a rectangle in step 805, as known in the art. In step 810, the textures may be further subjected to a fragment program, as known in the art, to further accelerate the calculation. Using the fragment program, all the mapped images may be projected and multiplied. In step 815, all the mapped images will be projected and rasterized into fragments. Using the fragment program, all the fragments on the same projection image pixel may be multiplied together, the result of which may be re-mapped onto the next possible rectangle until all the textures have been multiplied under step 820. After each texture has been mapped to the final rectangle, the result is an AAI for a particular voxel o in step 825. After the AAI for voxel o is acquired in step 610, then the re-projected image M of a particular voxel o can be derived in step 615.

Figure 10A:
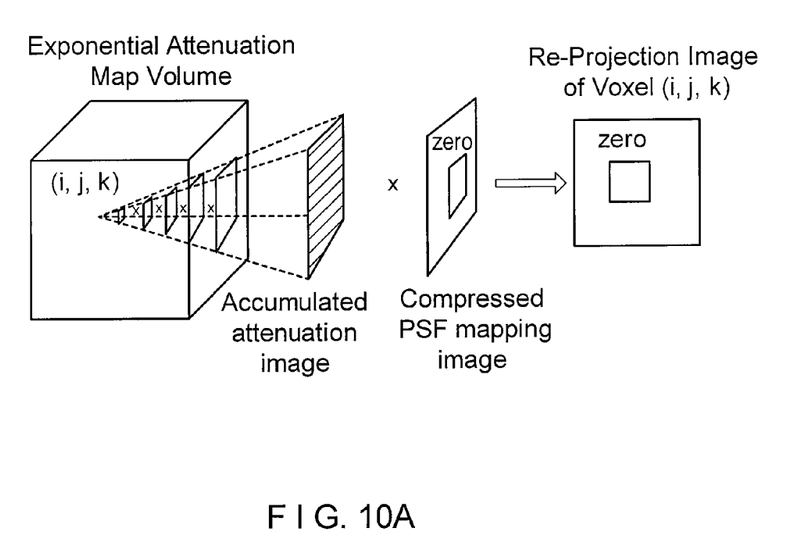
FIG. 10A is an exemplary illustration of the generation of the re-projection image of a particular voxel (i,j,k)
Figure 10B:
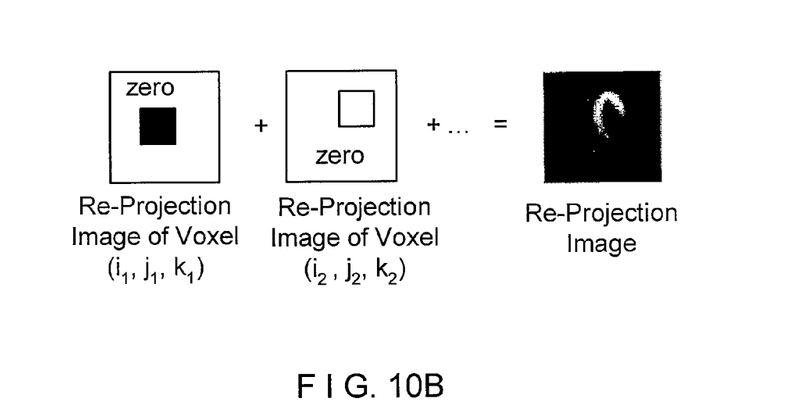
FIG. 10B is an exemplary illustration of the generation of the re-projection image for one particular view at a particular angle.

In step 615, a re-projected image M may be derived by multiplying the AAI for voxel o with the compressed PSF matrix for the voxel o. After all the voxels have been converted in their re-projected images, the iteration finishes in step 620. Referring to equation (6) and step 625, the final re-projection image of a particular view r may be represented by the sum of the re-projected images, which may be expressed by the multiplication of the PSF mapping images and the corresponding accumulated attenuation images from all voxels in the reconstruction space. By adding the re-projected images of all voxels with the corresponding weights $f^{(l,\alpha)}(i,j,k)$, the re-projection at this view r at angle/may be achieved, see FIG. 10A and FIG. 10B. In step 630, the scatter correction $s_{lmn}$ from equation (2) may be added to correct for scattering at a particular view r.

Returning to FIG. 5, after the re-projection image is achieved for a total of R views, r may be set back to zero so that iterations may begin for the back-projection operation 530 of the OS-EM algorithm for each view r at angle l, for a total of R views or iterations, as shown in steps 525 through 535. Compared to the re-projection operation in step 510, the back-projection procedure may provide the correction factors for the estimated image as shown in equation (2).

Figure 11:
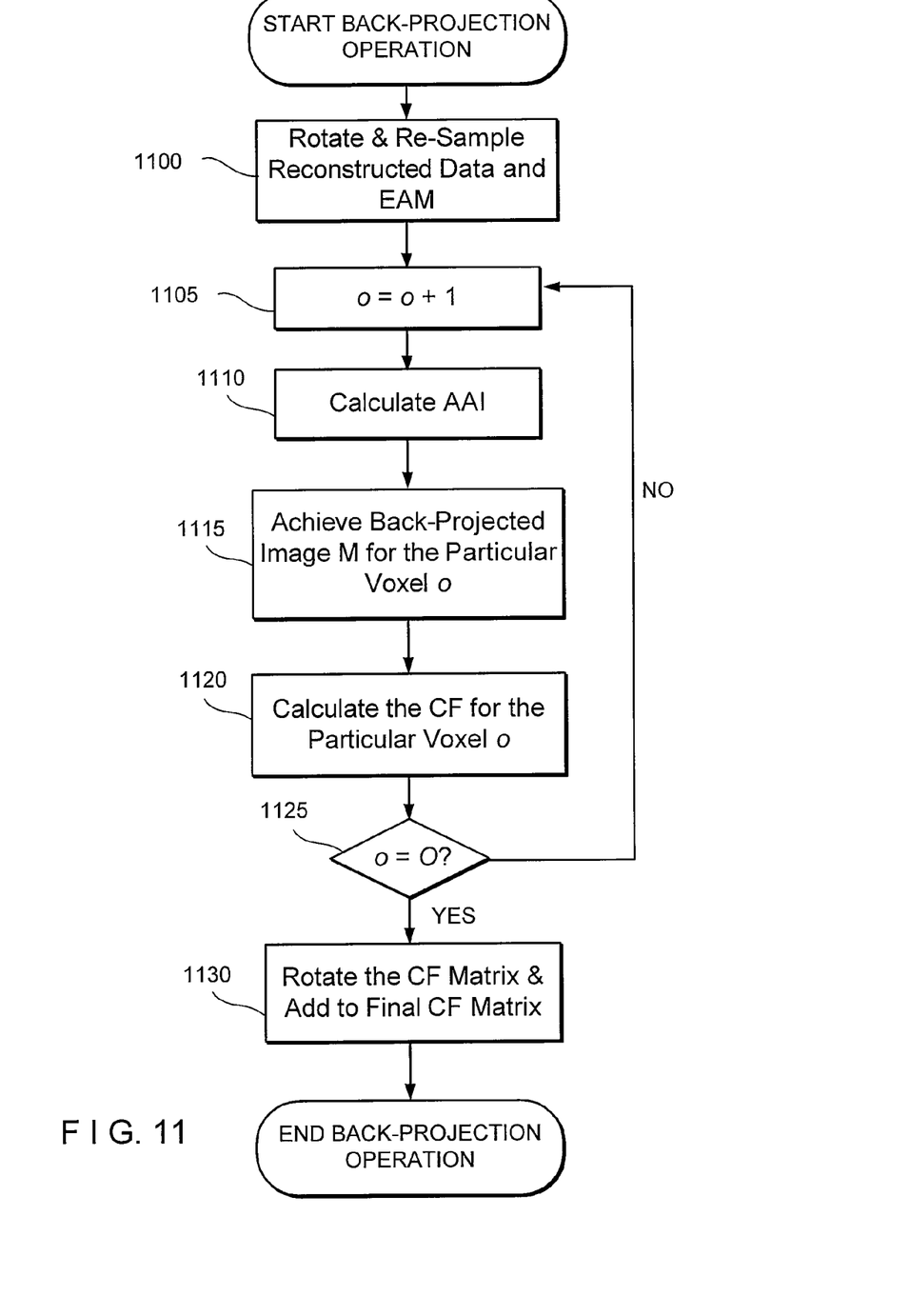
FIG. 11 is a simplified flow chart illustrating the steps of the back-projection operation segment of the iterative projection calculation.

Referring to FIG. 11, the back-projection process of step 530 is illustrated in further detail by steps 1100 through 1130. The back-projection operates on the ratio of the measured data and the re-projected data, provided in the exemplary equation:

$$f_{ijk}^{(l,\alpha+1)} = \frac{f_{ijk}^{(l,\alpha)}}{\sum_{lmn} h_{ijk,lmn}} \sum_{lmn} h_{ijk,lmn} \frac{p_{lmn}}{p_{lmn}^{(l)}} \quad (7)$$

$$= f_{ijk}^{(l,\alpha)} \cdot \frac{\sum_{l}\sum_{mn}\left(h_{ijk}^{l}(m,n) \cdot \frac{p^{l}(m,n)}{\overline{p}^{(l,\alpha)}(m,n)}\right)}{\sum_{l}\sum_{mn} h_{ijk}^{l}(m,n)}$$

$$= f_{ijk}^{(l,\alpha)} \cdot [\text{back-projection procedure}]$$

Similar to the re-projection operation, the exponential attenuation map is rotated for each view r 1100 and the projected image M of each voxel in the rotated objects is generated in steps 1105 through 1115. Acquiring projected image M for the back-projection operation is the same as acquiring the projected image M for the re-projection operation in FIG. 6. Both operations follow the flow chart shown in FIG. 8. After obtaining the AAI for voxel o in step 1110 from the steps illustrated in FIG. 8, the projected image M for voxel o may be derived in step 1115 by multiplying the AAI for voxel o with the corresponding PSF matrix for voxel o. After acquiring the image M for voxel o, in step 1120, a correction factor (CF) volume for a particular voxel o is generated, which is given by the term "[back-projection procedure]" in the second line of equation (7) and is set forth above in Equation (2). This set of calculations continues for a total of O iterations, shown in steps 1105, 1125, where O is the total number of voxels in the rotated data and o is the particular voxel being referenced in the calculations. The CF matrix, formed from the plurality of voxel's correction factors in a particular view, should be rotated back to its original angle for each ordered-subset group and added to the final CF matrix to complete the back-projection. The fully updated final CF matrix may then be used to adjust the value of each voxel after each iteration of the entire projection calculation in step 540. The entire projection calculation of step 120 will continue for at total of T iterations, see step 545. In an exemplary embodiment of the present invention, a visually satisfactory reconstruction was obtained after 4 iterations.

Taking advantage of the powerful texture-mapping capabilities of the PC graphics card, it is preferable that all the rotation, multiplication, and addition operations on the volume images be executed using the GPU. Since the GPU is specifically designed for image processing and manipulation, the whole re-projection and back-projection time can be performed efficiently. A float p-buffer, as known in the art, supporting 32 bit precision per color channel, may be used to implement the data generation instead of the traditional color frame buffer, which only supports 8 bit precision per color channel. The use of the preceding steps ensures high calculation precision and speed for the final result without loss of efficiency.

Figure 12:
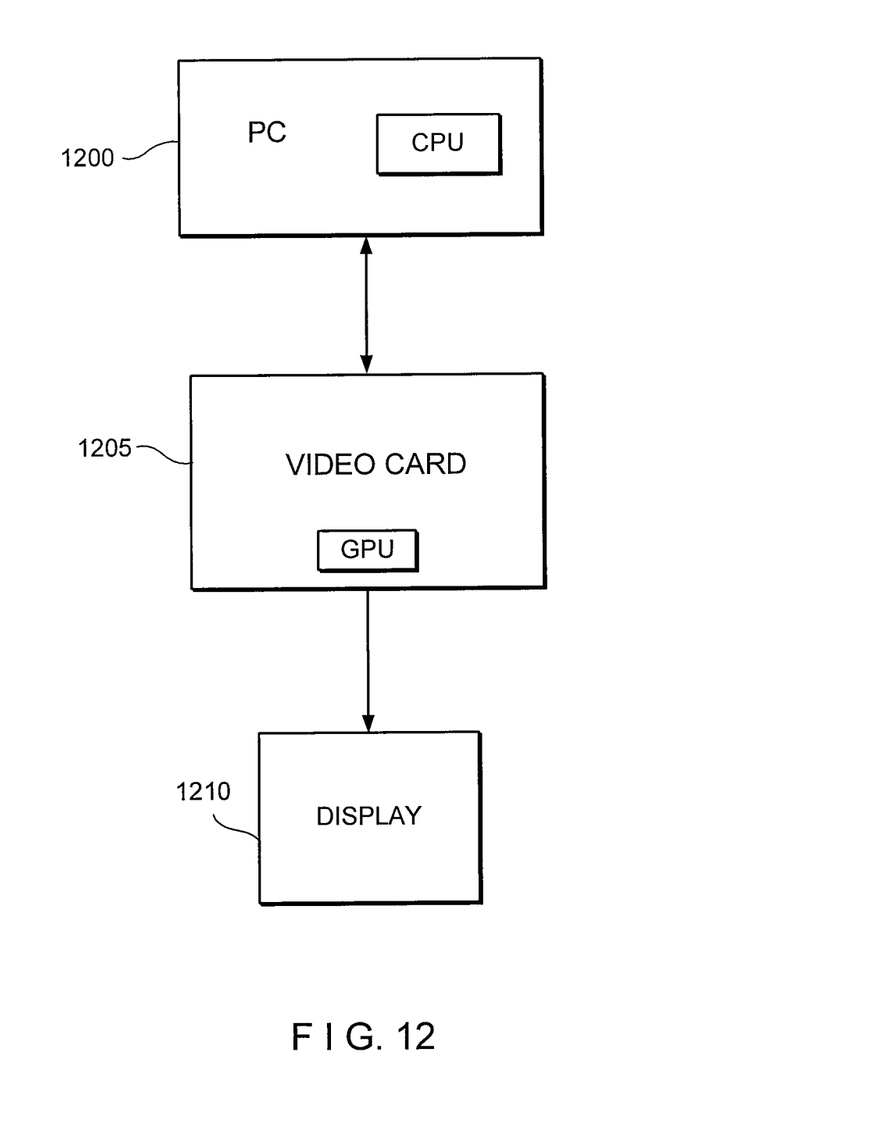
FIG. 12 is a schematic diagram illustrating the exemplary relationship among a personal computer with a CPU, a video card equipped with a GPU, and a display for the present invention.

Referring to FIG. 12, the exemplary embodiment of a hardware-based acceleration method was implemented by MS Visual C++ on a Pentium IV platform (1 GB RAM memory, 2.6 GHz CPU speed) 1200 with an Nvidia@ GeforceFX 5900 graphics card (256 MB video memory) 1205, which then creates an image on display 1210. Projections were simulated by the SIMIND MC program from the MCAT digital torso phantom to evaluate the efficiency of the presented acceleration method. The MCAT phantom had an array size 64×64×32 and 128×128×64 respectively. For each phantom size, the emission distribution was generated by selecting different emission concentrations in the heart, lungs and liver regions, respectively, that reflects the concentrations of a clinical setting. The attenuation map was given by the object geometries in the phantom, and scatter was simulated up to the second order. The VFF collimation with low energy ultra-high resolution was modeled in the MC simulation. The focal-length function of the VFF collimator varied quadratically from 60 cm at the collimator center to 200 cm at the edge, $F(r)=a+b|r|2$, where r represents the location of detector bin. The size of the collimator was 52×38 cm², simulating the Siemens' E-CAM SPECT system. A circular scanning orbit was considered with 64 and 128 views, respectively, evenly distributed on 360 degrees for the corresponding phantom size. The radius of rotation was 25 cm. The images were reconstructed into 64×64×32 and 128×128×64 arrays for the two phantom sizes, respectively. In order to utilize the system's geometrical symmetries, the number of the ordered subsets shall be four or eight, where the projections in each subset have the same geometrical symmetry. Projections were grouped into eight ordered subsets according to examples in the art.

The present methods provide for improved image reconstruction for quantitative SPECT images. In particular, the use of a compressed PSF matrix and advantageous use of features of commercially available graphics processing units provide for significant acceleration of OS-EM image reconstruction using convention personal computer hardware.

What is claimed is:

1. A method for reconstructing an image from emission data collected from a subject, comprising:
    generating a compressed point-spread function matrix having at least 3 dimensions;
    generating an accumulated attenuation factor; and
    performing at least one image projection operation on an image matrix of the emission data using the compressed point-spread function matrix having at least 3 dimensions and the accumulated attenuation factor.

2. The method of claim 1, wherein the compressed point-spread function matrix is generated in a pre-processing operation prior to performing the at least one image projection operation.

3. The method of claim 1, wherein the step of generating an accumulated attenuation factor further comprises generating an exponential attenuation map.

4. The method of claim 3, wherein the exponential attenuation map is generated in a pre-processing operation prior to performing the at least one image projection operation.

5. The method of claim 3, wherein the step of generating an accumulated attenuation factor further comprises interpolating attenuation values from a path between a voxel and a detector bin.

6. The method of claim 5, wherein the path between a voxel and a detector bin is sampled evenly with a fixed sampling length.

7. The method of claim 1, wherein the step of performing at least one image projection operation includes at least one of re-projection and back projection operations.

8. The method of claim 7, wherein the step of performing at least one image projection operation further comprises:
    rotating an image matrix to align with a selected viewing angle
    rotating an exponential attenuation map to align with the rotated image matrix;
    generating an accumulated attenuation image from the rotated image matrix and rotated exponential attenuation map; and
    generating a projection image by multiplying the accumulated attenuation image and point spread function matrix for each voxel.

9. The method of claim 8, wherein the steps of rotating the image matrix, rotating the exponential attenuation map and multiplying the accumulated attenuation image and point spread function matrix are performed on a graphics processing unit.

10. The method of claim 1, wherein the performing at least one image projection is performed by an ordered subset-expectation maximization algorithm.

11. The method of claim 1, wherein the performing at least one image projection is performed by a maximum likelihood-expectation maximization algorithm.

12. The method in claim 11, wherein the step of eliminating an angular component further comprises accounting for symmetry among different angles between a voxel and a detector bin.

13. The method of claim 11, wherein the step of eliminating a slice component further comprises accounting for symmetry among image slices.

14. The method of claim 1, wherein the step of generating a compressed point-spread function matrix having at least 3 dimensions further comprises:
    eliminating an angular component of the point-spread function matrix having at least 3 dimensions; and
    eliminating a slice component of the point-spread function matrix having at least 3 dimensions.

15. The method of claim 1, wherein the accumulated attenuation factor is generated for each voxel in an image.

16. The method of claim 15, wherein the accumulated attenuation factor generated for each voxel in an image is dependent at least in part on the coordinate values of each of at least three dimensions.

* * * * *